(No Model.)
G. D. HAWORTH.
CORN PLANTER.
No. 314,240.  Patented Mar. 24, 1885.
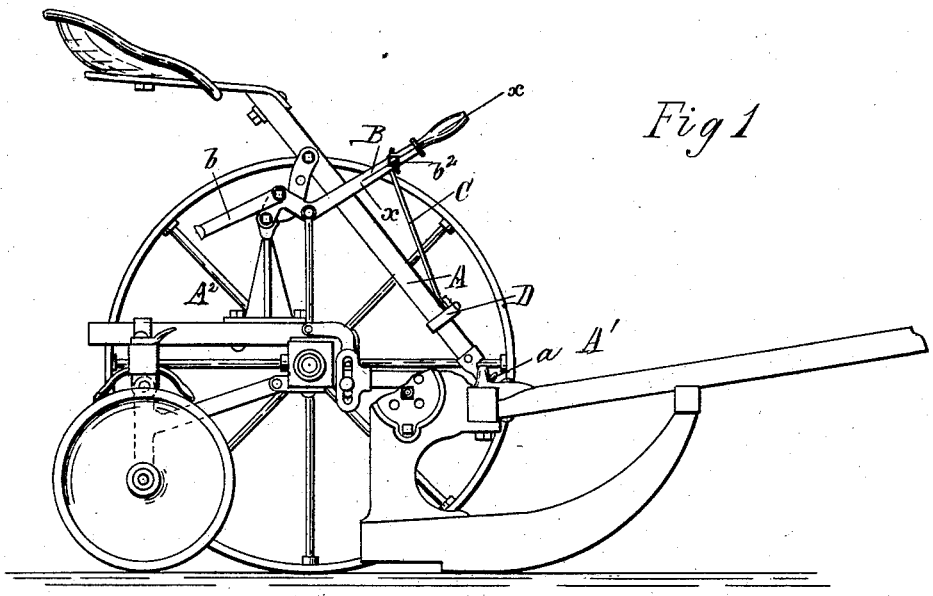
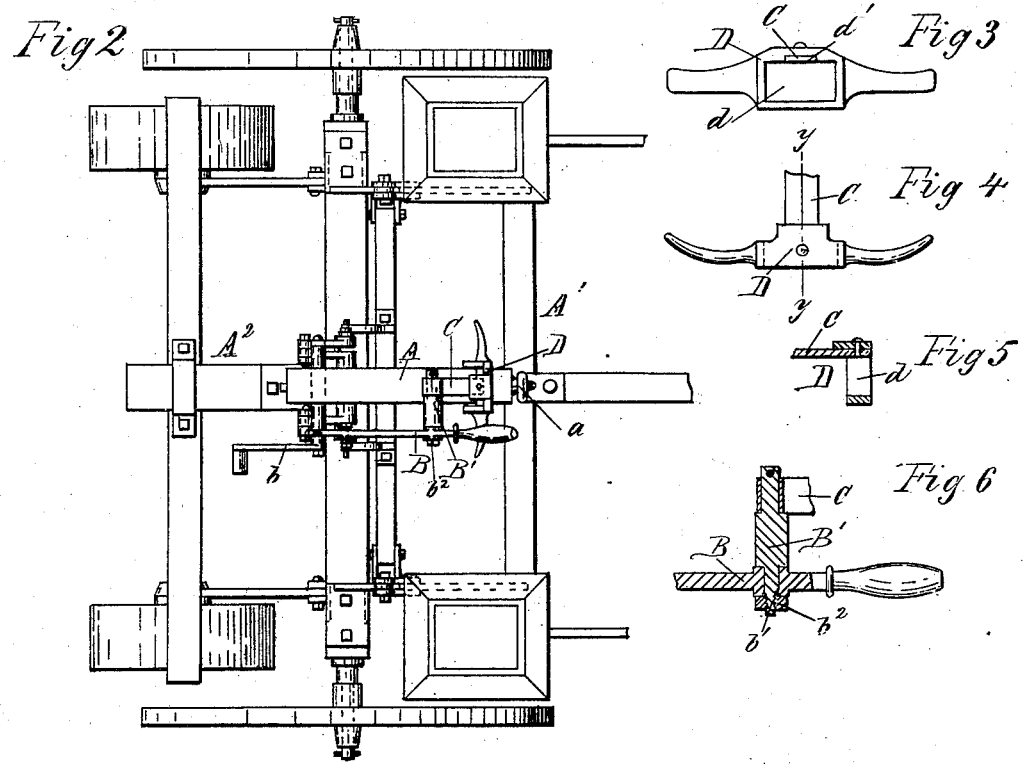
Witnesses
P. E. Rennemo
W. C. Corliss
Inventor
George D. Haworth
By Coburn & Thacher
Attorneys
N. PETERS, Photo-Lithographer, Washington, D. C.

United States Patent Office.

GEORGE D. HAWORTH, OF CHICAGO, ILLINOIS.

CORN-PLANTER.

SPECIFICATION forming part of Letters Patent No. 314,240, dated March 24, 1885.

Application filed November 12, 1884. (No model.)

*To all whom it may concern:*

Be it known that I, GEORGE D. HAWORTH, a citizen of the United States, and residing at Chicago, in the county of Cook and State of Illinois, have invented a certain new and useful Improvement in Corn-Planters, which is fully set forth in the following specification, reference being had to the accompanying drawings, in which—

Figure 1 is a side elevation of a machine embodying my invention; Fig. 2, a plan view of the same; Fig. 3, a front elevation of the stirrup; Fig. 4, a plan view of the same; Fig. 5, a sectional view on the line $y\ y$, Fig. 4; and Fig. 6, a sectional view on the line $x\ x$, Fig. 1.

Like letters refer to like parts in all the figures.

My invention relates to corn-planters, and more particularly to means for aiding in the operation of the hand-lever which controls the position of the seeding and covering frames, its object being to enable the operator to employ foot-power as well as hand-power in bringing forward the lever which lowers the seeding and covering frames; and to that end it consists in certain novel features, which I will now proceed to describe, and then specifically point out in the claims.

In the drawings I have shown my device as applied to the corn-planter shown and described in application No. 142,231, filed by me September 4, 1884, to which application reference is made for a further description of the mechanism shown, only that portion thereof which relates to my present invention being described in the present application.

In the drawings, A represents the seat-lever, which is suitably pivoted at $a$ to the forward frame, A′, which carries the seeding devices.

B indicates a lever, shown in the present instance as being mounted, as in my application hereinbefore mentioned, upon the rear frame, A², which carries the covering devices, so that when the lever is drawn backward the front and rear frames will both be raised from the ground, and that when it is thrown forward these frames will be lowered so as to be brought into contact with the ground in operative position. As in my former application, there is attached to the lower end of the lever B a prolongation, $b$, adapted to be operated by the foot of the driver in order to throw the lever back to raise the frames. In order to make provision for a similar application of foot-power in throwing the lever forward to lower the frames, I attach to the lever B a projection, B′, in any suitable manner, preferably in the manner shown in Fig. 6, in which projection B′ has a screw-threaded extension, $b'$, passing through the lever and adapted to receive a nut, $b^2$, to secure it in place.

C indicates a connecting rod or bar, the rear end of which is pivoted to the projection B′, and the forward end of which is attached to a stirrup, D, by means of which the rod is operated, this stirrup D being mounted so as to slide on a suitable guide or way. In the present instance the support D is shown as mounted on the seat-lever A, the stirrup having an aperture, $d$, through which the seat-lever passes loosely, and a groove or gain, $d'$, being formed in the upper part of this aperture to receive the forward end of the rod C, which is secured therein by a rivet or bolt.

The operation of my device is as follows: The machine being in the position shown in Fig. 1, the driver, by grasping the lever B and placing his foot upon the foot-lever $b$, may, by the combined power of his hand and foot, readily operate the lever to raise the covering and seeding frames. When it is desired to lower these frames, the operator places his foot upon the stirrup D, and can readily force the same forward with his whole strength, and at the same time bring his whole weight to bear upon it and upon the lever B, and thus lower the seeding and covering frames.

It is obvious that various mechanical modifications in the construction shown and described may be made without departing from the principle of my invention. Although I have shown my device as applied to the particular machine set forth in my application hereinbefore mentioned, yet I do not wish to limit myself to its application to this particular machine, as it is capable of use in combination with any of the numerous machines of the same class which employ a lever to operate the frames. It is also obvious that instead of using the seat-lever A as a guide for stirrup D to slide upon, a stirrup-guide may be attached to the frame for this purpose; but I deem the construction shown and described preferable. I also do not wish to limit myself to the precise maner shown and described of connecting the rod C to the lever B and stirrup D.

Having thus described my invention, what I claim as new, and desire to secure by Letters Patent, is—

1. In a corn-planter, the combination, with the lever for operating the seeding and covering frames, of a stirrup mounted to slide upon a suitable guide and having a connecting-bar pivoted to the hand-lever, substantially as and for the purposes specified.

2. In a corn-planter, the combination, with the lever for operating the seeding and covering frames, of the seat-lever supported upon said frames and a stirrup sliding upon said seat-lever and having a connecting-bar pivoted to the hand-lever, substantially as and for the purposes specified.

3. In a corn-planter, the combination, with the lever for operating the seeding and covering frames, the said lever having the foot-lever $b$ attached thereto, of a stirrup sliding on a suitable guide and having a connecting-bar pivoted to the hand-lever, substantially as and for the purposes specified.

4. The combination, with the lever B, having projection B' attached thereto, of the bar C, pivoted on said projection, and the stirrup D, having aperture $d$ and gain $d'$, in which the bar C is riveted, substantially as and for the purposes specified.

GEORGE D. HAWORTH.

Witnesses:
  IRVINE MILLER,
  CARLOTTA E. LITTLE.